United States Patent [19]

Dosaj et al.

[11] Patent Number: 4,997,474
[45] Date of Patent: Mar. 5, 1991

[54] SILICON SMELTING PROCESS

[75] Inventors: Vishu D. Dosaj; James B. May; John D. Oleson, all of Midland, Mich.

[73] Assignee: Dow Corning Corporation, Midland, Mich.

[21] Appl. No.: 428,532

[22] Filed: Oct. 30, 1989

Related U.S. Application Data

[62] Division of Ser. No. 239,144, Aug. 31, 1988, Pat. No. 4,897,852.

[51] Int. Cl.$^5$ .............................................. C22B 4/00
[52] U.S. Cl. ........................................ 75/10.5; 373/22
[58] Field of Search ........................... 75/10.5; 373/22

[56] References Cited

U.S. PATENT DOCUMENTS

| | | |
|---|---|---|
| 875,672 | 12/1907 | Potter . |
| 3,887,359 | 6/1975 | Enger et al. ........................... 75/11 |
| 4,213,599 | 7/1980 | Dewing et al. ...................... 266/166 |
| 4,269,620 | 5/1981 | Johannson ............................. 75/11 |
| 4,366,137 | 12/1982 | Lask ................................... 423/350 |
| 4,571,259 | 2/1986 | Fey et al. ............................ 373/22 |
| 4,865,643 | 9/1989 | Goins ................................. 75/10.5 |

FOREIGN PATENT DOCUMENTS

| | | |
|---|---|---|
| 0208567 | 1/1987 | European Pat. Off. . |
| 0177894 | 4/1988 | European Pat. Off. . |
| 1310789 | 10/1962 | France . |
| 49-37686 | 10/1975 | Japan . |
| 599561 | 5/1958 | U.S.S.R. . |
| 18659 | of 1900 | United Kingdom . |
| 2150128A | 6/1985 | United Kingdom . |

OTHER PUBLICATIONS

Muller et al., Scand. J. Metall., 1 (1972) pp. 145–155.
Chemical Abstracts, vol. 82:24, 6/16/75, p. 180, abstract no. 159017a.
Chemical Abstracts, vol. 69:12, 9/16/68, abstract no. 48877t.
Elektorwarme International, vol. 34:B2, 4/76, pp. B81–B84.
Miller et al., J. Am. Ceram. Soc., (1979) 62:3–4, pp. 147–149.
Kennedy et al., Proc. Br. Ceram. Soc., 33:Far. Sci. 3 (1983), pp. 1–15.

Primary Examiner—Peter D. Rosenberg
Attorney, Agent, or Firm—William F. Boley

[57] ABSTRACT

A silicon smelting furnace and a process for utilizing this furnace for the production of silicon is described. The process involves a process in which equilmolar proportions of silicon carbide and silicon dioxide are charged to the reaction zone of a silicon furnace. Above the furance is placed a shaft containing particulate carbon in the amount of 2 moles of carbon per mole of silicon dioxide charged to the reaction zone. As energy is applied to the reaction zone, molten silicon, gaseous silicon monoxide, and gaseous carbon monoxide are formed, the gases passing through the shaft of carbon, converting the carbon to silicon carbide. The silicon carbide, so formed, is combined with an equimolar proportion of silicon dioxide, and the cycle is repeated. Aside from an initial charge of silicon carbide, the feeds to the smelting furnace are silicon dioxide and carbon, silicon carbide being formed concurrently in a bed of carbon separated from the furnace reaction zone during the smelting cycle.

9 Claims, 3 Drawing Sheets

SILICON SMELTING PROCESS

This is a divisional of co-pending application Ser. No. 07/239,144 filed on 08/31/88 and now U.S. Pat. No. 4,897,852.

BACKGROUND OF THE INVENTION

This invention relates to a process for the smelting of silicon dioxide and silicon carbide to produce silicon.

At present, silicon is typically produced in a submerged electric arc furnace via the carbothermic reduction of silicon dioxide ($SiO_2$) with a solid carbonaceous reducing agent such as coke, coal, or wood chips. The overall reduction reaction can be represented as, $$SiO_2 + 2C = Si + 2CO$$

It is generally recognized that the above reaction in reality involves multiple reactions, the most significant being outlined below:

$$SiO_2 + 3C = SiC + 2CO \quad (1),$$

$$SiO_2 + C = SiO + CO \quad (2),$$

$$SiO + 2C = SiC + CO \quad (3),$$

$$2SiO_2 + SiC = 3SiO + CO \quad (4), \text{ and}$$

$$SiO + SiC = 2Si + CO \quad (5).$$

Muller et al., *Scand. J. Metall.* 1 (1972), pp. 145–155, describes and defines the theoretical equilibrium conditions for the Si—O—C chemical system of the carbothermic reduction of silicon dioxide to form silicon. A critical teaching of Muller et al. is the limitation that under equilibrium conditions the partial pressure of silicon monoxide (SiO) must be equal to or greater than 0.67 atmospheres at atmospheric pressure and at a temperature of 1819° C. for reaction (5), above, to occur to form silicon. By-produced carbon monoxide (CO) can have an inhibiting effect upon the formation of molten silicon.

The use of a submerged electric arc furnace for the production of silicon has been used on a commercial basis for many years. More recently the use of a transferred arc plasma as an energy source for the carbothermic reduction of silicon dioxide has been utilized.

Several references cite the use of SiC as a feed to a silicon furnace. These references include: Potter, U.S. Pat. No. 875,672 issued Dec. 31, 1907; Lask U.S. Pat. No. 4, 366,137, issued Dec. 28, 1982; British Patent 18,659, published July 28, 1900; UK Patent Application GB 2,150,128A, published June 26, 1985; Russian Patent 599,561, published May, 1958; Japanese Patent Publication 49-37686, published Oct. 11, 1974; European Patent Application 0 177 894, published Apr. 27, 1988.

Enger et al. U.S. Pat. No. 3,887,359, issued June 3, 1975, discloses the feeding of $SiO_2$ and carbon separately in separate zones of an electric arc furnace wherein the reaction gases pass through one or more zones rich in carbon. This invention is an attempt to minimize the losses of SiO.

Johannson, U.S. Pat. No. 4,269,620, issued May 26, 1981, discloses a continuous silicon smelting process for producing silicon from the reaction of SiO with SiC in the energy zone of furnace. In the process disclosed by Johannson $SiO_2$ (or a mixture of $SiO_2$ and carbon) and carbon are fed countercurrently toward the energy zone of the furnace. There are no apparent references to provisions for mixing the $SiO_2$ fed and the generated SiC. In the absence of mixing, one is led to conclude that control of the proportion of reactants within the furnace may not be adequate to effect efficient silicon production.

None of these references disclose a cyclic two-step batch procedure in which $SiO_2$ and SiC are reacted to form molten silicon, SiO, and CO, the SiO then being contacted with a bed of carbon to regenerate SiC.

SUMMARY OF THE INVENTION

It is an objective of the instant invention to improve raw material and energy utilization in the manufacture of silicon.

It has been found that molten silicon can be efficiently produced in a two-step operation in a furnace to which a shaft containing a bed of carbon is affixed. The process makes use of the reactions, $$SiO_2 + SiC = Si + SiO + CO \quad (6), \text{ and}$$

$$SiO + 2C = SiC + CO \quad (7).$$

The net effect is is the overall reaction to produce silicon, $$SiO_2 + 2C = Si + 2CO.$$

As discussed, supra the partial pressure of SiO is critical to the formation of molten silicon. A minimum partial pressure of SiO must be reached for silicon to form. When $SiO_2$ and carbon are reacted in the reaction zone of a silicon furnace, 2 moles of CO are generated per mole of molten silicon formed. In the instant invention the reaction of $SiO_2$ with SiC generates only 1 mole of CO per mole of silicon formed. The second mole of CO is generated in the carbon bed in the shaft. Thermodynamic analysis of the process of the instant invention suggests that silicon production can be effected at significantly lower temperature because of lower CO concentration and increased partial pressure of SiO in the reaction zone of a silicon furnace. The carbon bed of the furnace of the instant invention retains as SiC essentially all the SiO generated. In fact, silicon efficiencies as high as about 88 percent have been demonstrated by the instant invention. This silicon efficiency compares to efficiencies of about 75 percent for conventional submerged arc furnaces.

BRIEF DESCRIPTION OF THE DRAWING

The following drawings are presented to describe one embodiment of the instant invention.

DESCRIPTION OF THE DRAWING

Figure 1:
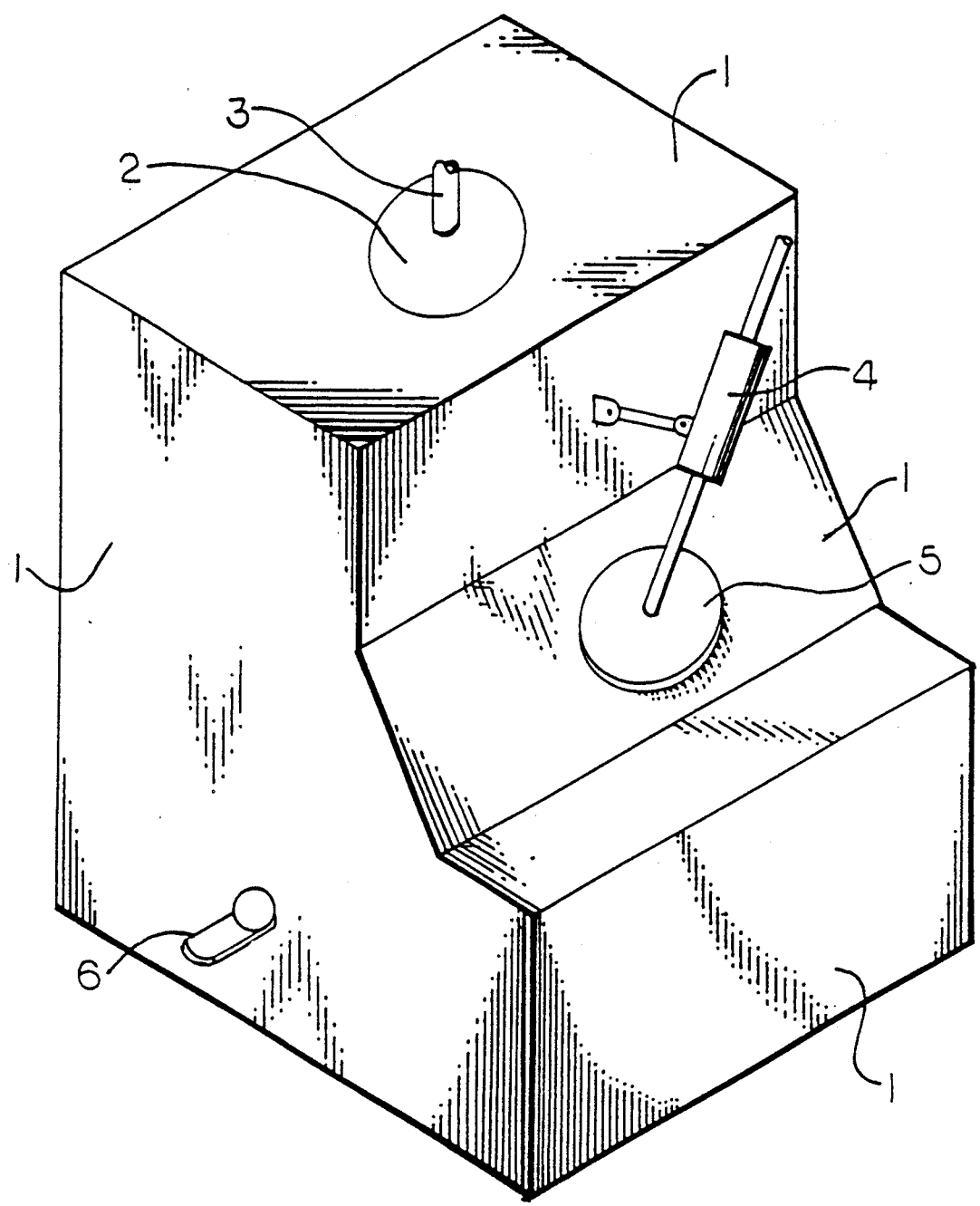
FIG. 1 is a view in perspective of the assembled silicon smelting furnace which constitutes the invention.

In FIG. 1, the assembled furnace is shown enclosed by a steel shell 1. A cover 2 defines the top of the shaft which contains a bed of particulate carbon. The cover 2 is connected by a gas outlet line 3 to conduct the remaining by-produced gases to means for recovering value of these gases as an energy source or as a chemical intermediate. A plasma torch assembly 4 enters the furnace body at an end opposite from the shaft through a water-cooled panel 5. A silicon tapping spout 6 exits at the bottom of the furnace body.

Figure 2:
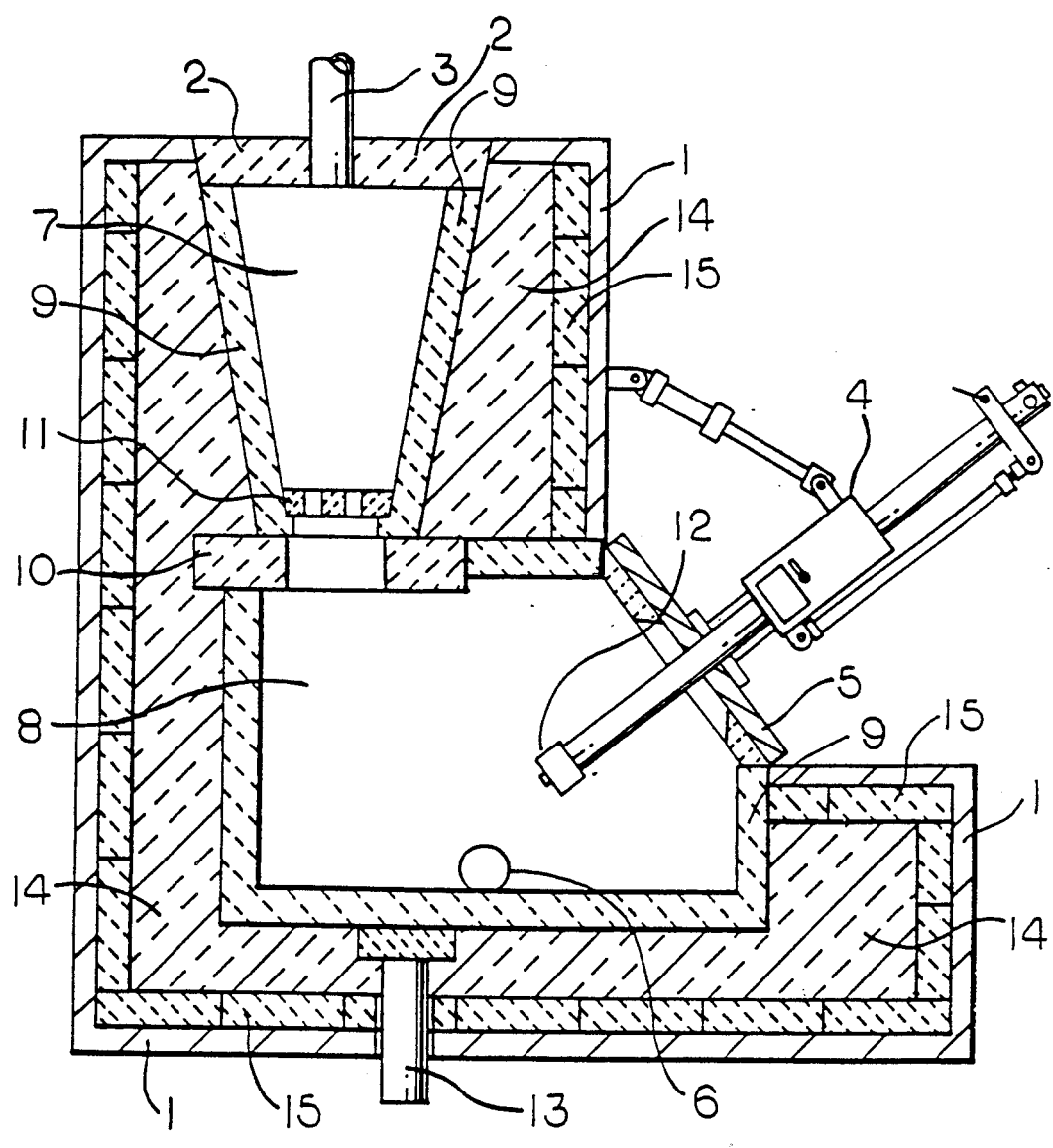
FIG. 2 is a cross sectional view of the furnace.

In FIG. 2, a shaft 7 is positioned on the top of a furnace body 8. The plasma torch assembly 4 enters the furnace body 8 at the end of the furnace body opposite the shaft through the water-cooled panel 5. The shaft 7 and the furnace body 8 are lined with carbon paste 9. The shaft 7 is a truncated cone which is supported above the furnace body 8 by graphite blocks 10. Cover 2 is in place in shaft 7 to keep the system closed during furnace operation. The cover 2 is disconnected at gas outlet line 3 to the gas handling means and removed for loading of the SiC from the shaft and feed $SiO_2$ to the furnace. A graphite support plate 11 is positioned at the bottom of the shaft. Fresh carbon is supported on this plate during furnace operation. At the end of the cycle, the support plate 11 is broken with a stoking rod allowing SiC and $SiO_2$ to be charged to the furnace. The plasma torch assembly 4 is positioned so that the cathode 12 can be slid into different positions within the furnace body 8. The plasma torch assembly 4 is also mounted so that the cathode 12 can be pivoted within the furnace body. An anode 13 is positioned below the furnace body 8. Silicon is removed from the furnace body via the tapping spout 6. The furnace body 8 and shaft 7 are enclosed, from inside to outside, by first a layer of chrome-alumina refractory 14. This layer of refractory is followed by a layer of insulating brick 15. The entire assembly is then encased by the steel shell 1.

Figure 3:
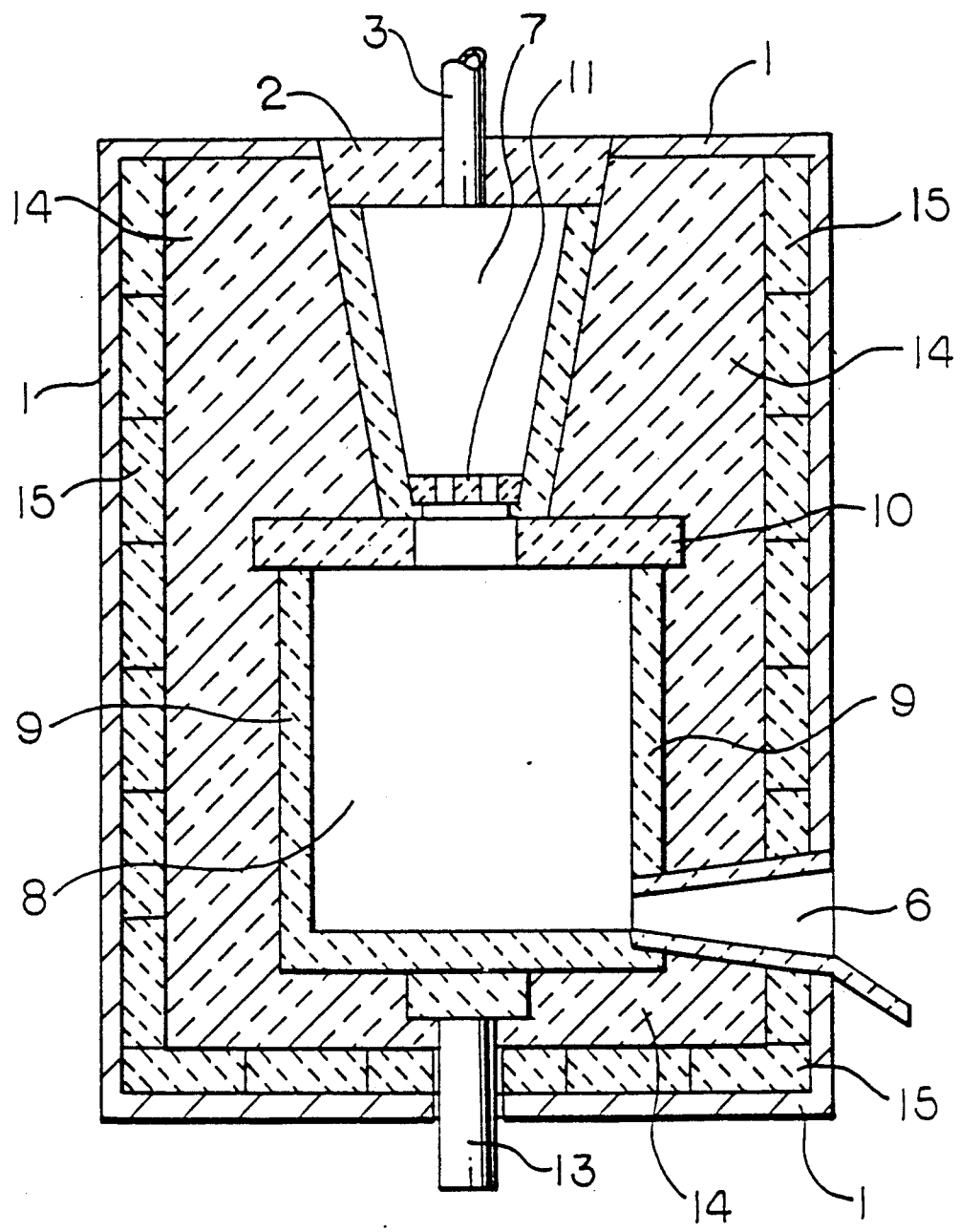
FIG. 3 is a side elevation view of the furnace.

FIG. 3 further shows the relationship of the shaft 7 to the furnace body 8. Additionally, the details of the molten silicon tapping spout 6 are shown.

DESCRIPTION OF THE INVENTION

The instant invention provides for a silicon smelting furnace such as that described in the figures above. What is described, therefore, is a silicon smelting furnace comprising
- (A) a furnace body, said furnace body being a substantially closed vessel, defining a reaction zone for containing solid reactants and molten silicon;
- (B) a shaft suitable for containing solid particulates of carbon and suitable for passing gases from the furnace body through the shaft the shaft being attached to the top of the furnace body at a first opening in the furnace body;
- (C) an energy source, said energy source being fit into the furnace body through a second opening in the furnace body;
- (D) means for supporting solid particulates of carbon, said means for supporting solid particulates being positioned at the bottom of the shaft, said means for supporting solid particulates being capable of allowing gas to pass from the furnace body up through the shaft; and
- (E) an anode for the energy source, said anode being positioned within the furnace body; and
- (F) means for collecting molten silicon, said means being implemented at a third opening in the furnace body, said third opening being in the lower portion of the furnace body.

The configuration of the silicon smelting furnace of the instant invention facilitates efficient operation of a two-step process in which silicon carbide is prepared concurrently but in a carbon bed separated from the reaction zone of the furnace where molten silicon is formed; the raw materials fed to the system being silicon dioxide and carbon. Attaching a shaft for containing a bed of carbon facilitates contact of the by-produced gases from the reaction zone, minimizes loss of heat, and facilitates mixing of resultant silicon carbide with silicon dioxide and charging to the reaction zone of the furnace by standard stoking techniques. Introducing the energy source into a wall of the furnace body, facilitates location of the shaft above the furnace body.

The configuration and construction of the furnace body is similar to that for conventional smelting furnaces.

The shaft which is positioned above the furnace body can be any vertical, open configuration such as, for example, a cylinder, a shaft with a square or rectangular cross-section, a structure with sloping sides such as a truncated cone. A truncated cone is a preferred configuration for the shaft.

The design of the shaft has a significant impact upon the efficient conversion of SiO to SiC. Those skilled in the art of gas/solid reactor design recognize the need to control such factors as: (1) particle size of the solids within a shaft and (2) relative height and cross-sectional area (or a shaft cross-sectional dimension, such as diameter for a circular crosssection) of the shaft to effect the necesSary superficial velocities and residence times of gases within the shaft to achieve efficient conversion of SiO to SiC. For the purposes of the instant invention, the height of the shaft will be represented by "H", and the cross-sectional dimension will be represented by "D". In the example, infra, it is shown that for a circular shaft, a H/D ratio of about 2 was effective in the conversion of SiO to SiC. The inventors believe that, for the scale used in the example, higher H/D ratios would be effectively utilized, but supplemental heating would be needed to provide a sufficient temperature within the carbon bed to effect conversion of SiO to SiC. A limiting factor on the H/D ratio is the pressure drop through the bed of carbon.

As the scale of production increases, the needed H/D ratio to maintain corresponding superficial velocities and residence times would decrease. However, a minimum H/D ratio would have to be maintained to reduce channelling of gases through the bed of solids to assure sufficient contact of gaseous SiO with the solid carbon particles. The inventors believe that a shaft H/D ratio in the range of from about 0.1 to 10 is effective for the instant invention.

Supplemental heating of the shaft can be effected by such known means as, for example, resistance heating.

The energy source can be known means such as, for example a graphite electrode or a transferred arc plasma torch, either source coupled with an anode within the furnace body. The preferred energy source is a direct current transferred arc plasma torch. The transferred arc plasma uses a minimum amount of plasma gas and minimizes dilution of gaseous SiO in the reaction zone. The plasma gas can be, for example, argon, hydrogen, or mixtures thereof.

To effect efficient transfer of thermal energy within the silicon smelting furnace of the instant invention it is preferred that the electrode or plasma torch should be movably mounted within the furnace body. An example of such a movable mounting would be a configuration in which the electrode or cathode of a plasma torch would be movable along its vertical axis, being movable in and out of the furnace body. Another example of a mounting configuration would be mounting on a pivot which would allow the electrode or cathode of a plasma torch to be swung in an arc within the furnace body.

The movable mounting could also be, for example, a combination of such mountings. The electrode or cathode of a plasma torch should preferably enter the furnace body through a wall.

Means for supporting solid particulates of carbon can be any conventional means which will effectively hold the solids while allowing by-produced gases from the furnace body to pass up through the shaft. Such conventional means can be such as, for example, a perforated plate.

Means for collecting molten silicon can be such conventional means as, for example, batch or continuous tapping. Means for collecting molten silicon could be effected, for example, at an opening in the bottom of the furnace body or at a location low in a wall of the furnace body.

The instant invention also provides for a process for smelting silicon, utilizing the smelting furnace described above under conditions that will be delineated herein. What is described, therefore, is a process for producing silicon via the reduction of silicon dioxide with silicon carbide in a silicon smelting furnace, as described above, the process comprising (G) providing an initial feed mixture to the reaction zone, said initial feed mixture consisting essentially of an equimolar mixture of silicon carbide and silicon dioxide;

(H) loading the shaft with carbon, the quantity of carbon being essentially two moles of carbon per mole of the silicon dioxide in the reaction zone;

(J) applying energy to the reaction zone to effect conversion of the feed mixture to molten silicon, gaseous silicon monoxide and carbon-monoxide; the gaseous carbon monoxide passing through the shaft loaded with carbon, the gaseous silicon monoxide passing into the shaft and reacting with carbon to form silicon carbide;

(K) recovering the molten silicon from the reaction zone;

(L) mixing the silicon carbide formed in the shaft with an essentially equimolar quantity of an additional portion of silicon dioxide to form a second mixture; and loading said second mixture to the reaction zone;

(M) loading the shaft with carbon, the quantity of carbon being essentially two moles of carbon per mole of the silicon dioxide loaded to the reaction zone;

(N) applying energy to the reaction zone to effect conversion of the silicon dioxide and silicon carbide to molten silicon, gaseous silicon monoxide and carbon monoxide; the gaseous carbon monoxide passing through the shaft loaded with carbon, the gaseous silicon monoxide passing into the shaft and reacting with carbon to form silicon carbide;

(P) recovering the molten silicon from the reaction zone;

(Q) repeating steps (L) through (P).

The process of the instant invention is based upon the reactions, discussed supra, $SiO_2 + SiC = Si + SiO + CO$, and $SiO + 2C = SiC + CO$.

The net effect is production of silicon according to the overall reaction, $SiO_2 + 2C = Si + 2CO$.

The instant invention, after an initial charge of SiC, depends upon the reaction of SiO in a bed of carbon to generate SiC concurrently in the shaft above the reaction zone of the silicon furnace.

The initial charge of SiC may be SiC produced externally from the furnace of the instant invention. The initial charge of SiC can be produced in the furnace. As an example, the initial charge of SiC may also be produced in the furnace by charging equimolar amounts of $SiO_2$ and silicon to the furnace body, while charging 4 moles of carbon per mole of $SiO_2$ charged to the furnace body into the shaft of the furnace. Applying energy to the furnace results in formation of SiC via the reactions, $SiO_2 + Si = 2SiO$, and $2SiO + 4C = 2SiC + 2CO$.

As a further example, the initial charge of SiC can also be prepared in the furnace by utilizing the reactions, $SiO_2 + C = SiO + CO$, and $SiO + 2C = SiC + CO$.

using a similar process scheme just discussed.

The silicon dioxide which is fed to the furnace separately or combined in a mixture with silicon carbide can be quartz, in its many naturally occurring forms (such as sand), fused and fume silicon, precipitated silica, and silica flour in their many forms. The form of the silicon dioxide can be, for example, powder, granule, lump, pebble, pellet, and briquette. Particle size of the silicon dioxide is not considered by the inventors to be critical for the instant invention.

The carbon which is loaded into the shaft for reaction with by-produced SiO to form SiC can be, for example, carbon black, charcoal, coal, or coke. The form of the carbon can be, for example, powder, granule, chip, lump, pellet, and briquette. For effective operation of the shaft in which SiO is reacted with particulate carbon to form SiC, it is preferred that the particle size of carbon be as small as possible to facilitate effective contact of SiO with carbon while not creating problems of particles being carried by the gases or high pressure drop through the bed of carbon.

In the instant invention, once stable furnace operation is established, essentially equimolar quantities of $SiO_2$ and SiC are charged to the reaction zone of the furnace. An amount of carbon equal to about 2 moles of carbon per mole of $SiO_2$ is placed in a shaft located at the top of the furnace. As energy is applied to the reaction zone, molten silicon is formed and is tapped. Gaseous by-produced SiO and CO, at an elevated temperature pass up into the bed of carbon, the SiO reacting with carbon to form SiC. The SiC in the shaft is mixed with an equimolar amount of $SiO_2$, and the above sequence is repeated and can be repeated over many cycles. Mixing of the SiC formed in the shaft with fresh $SiO_2$ can be effected, for example, by adding $SiO_2$ to the SiC in the shaft and manually or mechanically stirring the solids together. A more preferable means for mixing $SiO_2$ and SiC is to break the means for supporting solids in the shaft, then pouring fresh $SiO_2$ into the hole, causing the SiC to be drawn into and mixed with the stream of falling $SiO_2$.

The quantity of the carbon loaded to the shaft of the furnace should be essentially in stoichiometric balance with the $SiO_2$ fed to the furnace, 2 moles of carbon per mole of $SiO_2$. It is understood that use of less than a stoichiometric amount of carbon to $SiO_2$ will result in the loss of SiO from the system. Conversely, it is understood that use of more than the stoichiometric amount of carbon will result in an excess of carbon in the shaft at the end of the cycle with carbon being fed to the reaction zone of the furnace, diminishing the advantages of the instant invention.

It is understood that less than the stoichiometric quantity of SiC relative to $SiO_2$ fed to the furnace can be utilized, however, with the penalty that silicon raw material efficiency will be reduced by a build-up of $SiO_2$ in the furnace. It is further understood that greater than the stoichiometric quantity of silicon carbide relative to silicon dioxide can be utilized, however, with a resultant build-up of silicon carbide in the silicon furnace.

For purposes of this invention the terms "consisting essentially of an equimolar mixture of silicon carbide and silicon dioxide" and "essentially two moles of carbon per mole of silicon dioxide" means that the molar proportion of these materials relative to one another is preferably within about 1 to 2 mole percent of the stoichiometric quantity. However, the inventors believe that the instant invention can be carried out effectively in a range from about 1.8 to 2.2 moles of carbon per mole of $SiO_2$.

The preferred energy source is a transferred arc plasma torch aimed at an anode in the furnace body. The transferred arc plasma uses a minimum amount of plasma gas and minimizes dilution of gaseous SiO in the reaction zone. The plasma gas can be, for example, argon, hydrogen, or mixtures thereof. It is preferred that the plasma torch be a direct current plasma to facilitate transfer of the plasma in this particular furnace configuration.

The energy source can also be a graphite electrode aimed at an anode in the furnace body in a manner similar to that used with the plasma torch.

The furnace is designed so that pressures in the range of atmospheric pressure to 6 atmospheres can be maintained. Operation of a closed furnace at atmospheric pressure or higher better facilitates recovering the by-produced gases after the gases exit the furnace. For the purposes of the instant invention the term "closed furnace" means that the flow of gas exiting the furnace is restricted by the bed of carbon or a gas pressure control valve to prevent external gases from entering the furnace. A closed furnace facilitates recovery of essentially undiluted by-produced gases.

"Recovering molten silicon" means any conventional means of removing the molten silicon product from the reaction zone by such known techniques as batch or continuous tapping.

The instant invention effectively removes SiO from the by-produced gases. As such, the problems associated with the presence of SiO in the by-produced gases relative to using these gases as an energy source or as a chemical intermediate have been essentially eliminated. At present by-produced gases from silicon furnaces are handled by direct disposal techniques such as venting or burning. A representation of a possible composition of silicon furnace gas is as follows:

| CO | 49% |
| $H_2$ | 34% |

-continued

| $CH_4$ | 14% |
| Air | 2% |
| $CO_2$ | 1% |

The by-produced gases have sufficient carbon and hydrogen content to be utilized as a chemical intermediate or as a combustible fuel. The above gas mixture has an energy or heating value of approximately 250 to 300 British Thermal Units (BTU)/ standard cubic feet of gas. The above by-produced gases could be used as a fuel for combustion in such known processes as a boiler for the generation of steam. Additionally, the by-produced gases could be used for combustion in a gas turbine which is coupled to an electric generator. The electricity so generated could supplement much of the electricity needed for operation of the silicon furnace.

From the representation of the by-produced gases, supra, carbon monoxide and hydrogen are the primary components of the by-produced gases. Carbon monoxide is known as a valuable raw material in the preparation of organic chemicals such as alcohols, ketones, aldehydes, amines, carboxylic acids, and the like.

So that those skilled in the art may better understand and appreciate the instant invention the following example is presented. This example is presented to be illustrative and is not to be construed as limiting the claims delineated herein.

EXAMPLE 1

A closed smelting furnace configuration similar to that described in the figures, supra, was assembled. The reaction zone of the furnace body had dimensions of 850 mm by 380 mm at the base and 350 mm in height. A shaft in the form of a truncated cone, was positioned at an opening at one end of the top of the furnace body. The cone was about 450 mm in height with an inside diameter of 200 mm at the juncture with the furnace body, tapering to an inside diameter of about 390 mm at the top of the cone. Pieces of graphite plate were positioned inside the shaft parallel to the outside edge of the cone to produce a semicircular cross section to the cone. The resultant shaft configuration approximated a truncated cone starting with a diameter of about 100 mm at the juncture with the furnace body, tapering to an inside diameter of about 300 mm at the top. A perforated graphite plate was placed above the opening of the furnace body at the bottom of the shaft to support particulate carbon while allowing by-produced gases to contact the particulates to form silicon carbide.

A plasma torch was used as the energy source. The plasma torch was a 100 kW direct current transferred arc unit manufactured by Voest-Alpine, Linz, Austria. The plasma torch was mounted so that the cathode could be inserted or retracted along its vertical axis. Additionally, the plasma torch was mounted so that the cathode could pivot from a horizontal position to positions below the horizontal.

A spout for tapping molten silicon exited the side of the furnace body, near the bottom at a location essentially below the shaft.

The raw materials utilized were silicon, silicon dioxide, and charcoal. The silicon dioxide was Bear River Quartz from California. The quartz had a particle size that was primarily in the range of ¾ to 1 inch. The charcoal was Austrian hardwood charcoal. The charcoal had a particle size primarily in the range of ¼ to ½ inch.

The plasma torch was operated at an argon flow rate of 0.9 Nm³/hr. The furnace body was preheated for 4 hours in this configuration.

The furnace was initially loaded with 1.00 kg of silicon. This was then followed by three charges which were an essentially equimolar mixture of silicon (Si) and silicon dioxide ($SiO_2$). The Si and $SiO_2$/Si mixtures were charged to the furnace body through the shaft, which at this time did not contain a support plate. The $SiO_2$/Si mixture was allowed to react to generate gaseous silicon monoxide (SiO). The gaseous SiO further preheated the furnace body and shaft. A support plate was then placed in the shaft. The shaft was then charged with 2.0 kg of charcoal. The shaft was connected to the line for the by-produced gases. After a power input of about 200 kWh, the cover of the shaft was removed; 4.64 kg of $SiO_2$ was added to the shaft; the contents of the shaft were charged to the furnace by breaking the support plate with a stoking rod. Once the support plate was broken, a hole was produced in the bed of SiC. The SiC was not very free-flowing. Pouring the particulate $SiO_2$ into the hole pulled SiC into the flowing $SiO_2$ stream, effecting mixing of the SiC and $SiO_2$. A new support plate was placed into the shaft. 3.0 kg of charcoal was charged to the shaft. The shaft was again sealed, and the run proceeded. This cycle was repeated after each 200 kwh input of power over a period of approximately 39 hours. The broken graphite support plates were also added to the furnace body and were considered a part of the total carbon fed. The proportions of total carbon (charcoal and graphite plate) and $SiO_2$ charged were essentially 2 moles of carbon per mole of $SiO_2$. The broken graphite support plates also were added to the furnace. Molten silicon was tapped from the furnace at each cycle.

Table 1 is a summary of the material charged to the furnace and the molten silicon tapped from the furnace. In Table 1, the time, in hours, after feeding of materials was begun is designated "Time"; $SiO_2$ charge, in kg, is designated "$SiO_2$"; silicon charge, in kg, is designated "Si", charcoal charge, in kg, is designated "Char"; the weight of the graphite support plate, in kg, is designated "Plate"; and the molten silicon tapped, in kg, is designated "Tap".

TABLE 1

| Time | $SiO_2$ | Si | Char | Plate | Tap |
|---|---|---|---|---|---|
| 0 | — | 1.00 | — | — | — |
| 3.0 | 3.58 | 1.67 | — | — | — |
| 4.2 | 3.58 | 1.67 | — | — | — |
| 6.7 | 3.58 | 1.67 | — | — | — |
| 9.7 | 3.58 | 1.67 | 2.0 | 0.18 | — |
| 11.0 | 4.64 | — | 3.0 | 0.05 | — |
| 12.5 | 7.65 | — | 4.0 | 0.27 | 0.63 |
| 13.7 | 9.97 | — | 4.0 | 0.25 | 1.18 |
| 15.5 | 9.97 | — | 4.0 | 0.28 | 0.47 |
| 17.5 | 9.97 | — | 4.0 | 0.26 | 0.44 |
| 21.5 | 9.97 | — | 4.0 | 0.26 | 1.40 |
| 25.5 | 9.97 | — | 4.0 | 0.28 | 1.25 |
| 29.5 | 9.97 | — | 4.0 | 0.25 | 0.75 |
| 30.5 | 9.97 | — | 4.0 | 0.21 | 1.55 |
| 32.0 | 9.97 | — | 4.0 | 0.25 | 2.42 |
| 35.2 | 12.46 | — | 5.0 | 0.21 | 1.08 |
| 38.2 | 9.76 | — | 4.0 | 0.21 | 1.49 |
| 40.9 | 9.76 | — | 4.0 | 0.20 | 3.06 |
| 43.7 | 9.76 | — | 4.0 | 0.24 | 3.55 |
| 45.9 | 9.76 | — | 4.0 | 0.24 | 3.40 |
| 48.0 | 10.26 | — | 4.0 | 0.20 | 4.82 |
| 49.8 | 9.76 | — | 4.0 | 0.20 | 3.50 |

TABLE 1-continued

| Time | $SiO_2$ | Si | Char | Plate | Tap |
|---|---|---|---|---|---|
| 52.2 | 10.00 | — | 4.0 | 0.21 | 6.12 |

It appears from these results that stable operating conditions were not reached until about the last 12 to 13 hours of this run. For the last 12 to 13 hours of this run, silicon recovery was about 88 percent. As a comparison, silicon recovery in a conventional 200 kVA direct arc furnace is about 75 percent.

The above results demonstrate the operation of the instant invention.

What is claimed is:

1. A process for producing silicon via reduction of silicon dioxide with silicon carbide in a silicon smelting furnace, the silicon smelting furnace having
   (A) a furnace body, the furnace body being a substantially closed vessel, defining a reaction zone for containing solid reactants and molten silicon;
   (B) a shaft suitable for containing solid particulates of carbon and suitable for passing gases from the furnace body through the shaft, the shaft being attached to the top of the furnace body at a first opening in the furnace body; and
   (C) an energy source, said energy source being fit into the furnace body through a second opening in the furnace body;
   the process comprising:
   (D) providing an initial feed mixture to the reaction zone, said initial feed mixture consisting essentially of an equimolar mixture of silicon carbide and silicon dioxide;
   (E) loading the shaft with carbon, the quantity of carbon being essentially two moles of carbon per mole of the silicon dioxide in the reaction zone;
   (F) applying energy to the reaction zone to effect conversion of the initial feed mixture to molten silicon, gaseous silicon monoxide and carbon monoxide; the gaseous carbon monoxide passing through the shaft loaded with carbon, the gaseous silicon monoxide passing into the shaft and reacting with the carbon to form silicon carbide;
   (G) recovering the molten silicon from the reaction zone;
   (H) mixing the silicon carbide formed in the shaft with an essentially equimolar quantity of an additional portion of silicon dioxide to form a second mixture; and loading the second mixture to the reaction zone;
   (I) loading the shaft with carbon, the quantity of carbon being essentially two moles of carbon per mole of the silicon dioxide loaded to the reaction zone;
   (J) applying energy to the reaction zone to effect conversion of the silicon dioxide and silicon carbide to molten silicon, gaseous silicon monoxide and carbon monoxide; the gaseous carbon monoxide passing through the shaft loaded with carbon, the gaseous silicon monoxide passing into the shaft and reacting with carbon to form silicon carbide;
   (K) recovering the molten silicon from the reaction zone; and
   (L) repeating steps (H) through (K).

2. A process according to claim 1, wherein the silicon carbide in the initial feed to the reaction zone is prepared in the smelting furnace.

3. A process according to claim 1, wherein the energy source is a transferred arc plasma torch.

4. A process according to claim 3, wherein the plasma gas is hydrogen.

5. A process according to claim 1, wherein the energy source is a graphite electrode.

6. A process according to claim 1, wherein the silicon dioxide is selected from a group consisting of quartz, fused silica, silica flour, fumed silica and precipitated silica.

7. A process according to claim 1, wherein the carbon is selected from a group consisting of carbon black, charcoal, coke, and coal.

8. A process according to claim 1, wherein the process further comprises recovering energy value from the carbon monoxide exiting the shaft.

9. A process according to claim 1, wherein the process further comprises utilizing the carbon monoxide exiting the shaft as a chemical intermediate.

* * * * *